Aug. 19, 1958

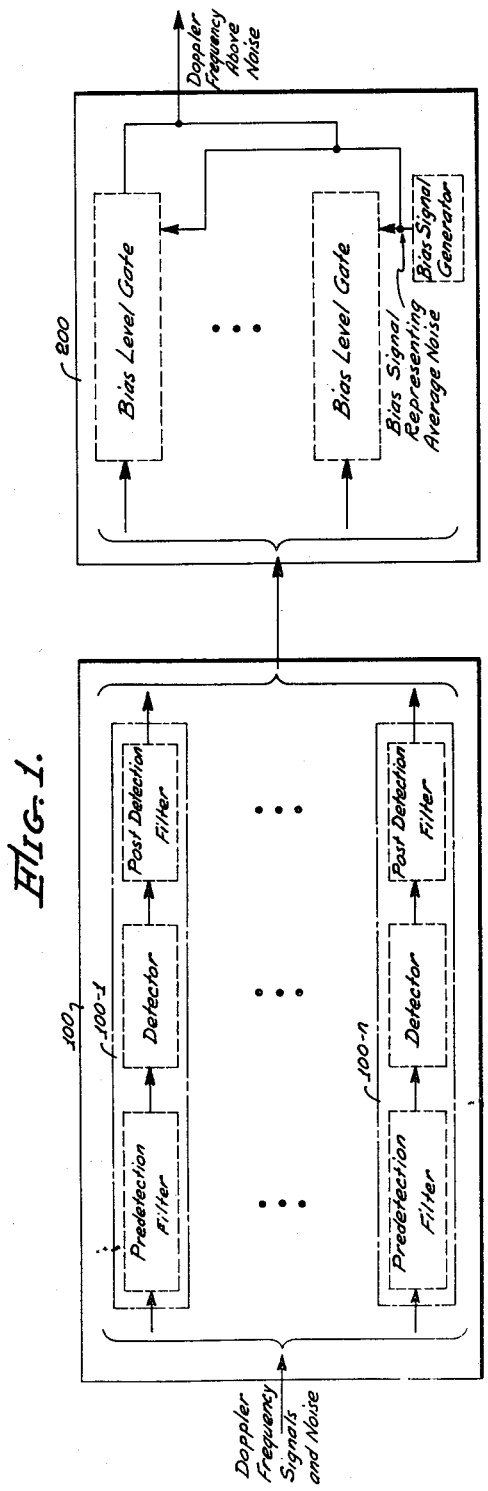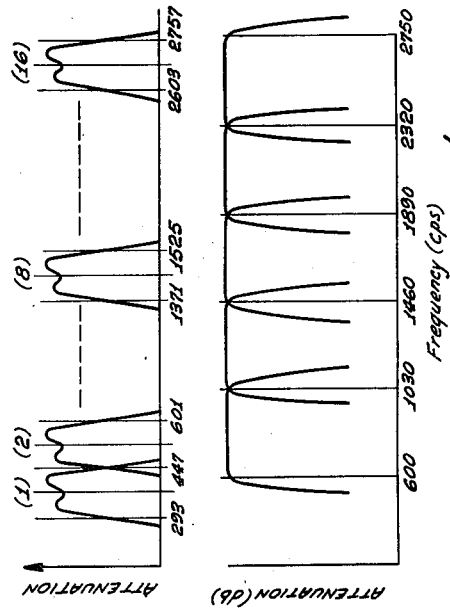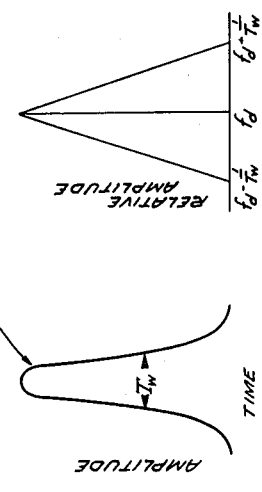

B. E. COWART ET AL 2,848,713

HIGHLY DISCRIMINATIVE FILTER AND BIAS-LEVEL GATING CIRCUIT

Filed Feb. 3, 1955

BROOKS EHRMON COWART
LLOYD DAVID BALL
JOHN J. DASPIT
INVENTORS.

BY

ATTORNEY.

BROOKS EHRMON COWART
LLOYD DAVID BALL
JOHN I. DASPIT
INVENTORS.

BY

ATTORNEY.

# 2,848,713

HIGHLY DISCRIMINATIVE FILTER AND BIAS-LEVEL GATING CIRCUIT

Brooks Ehrmon Cowart, Pacoima, Lloyd David Ball, Los Angeles, and John I. Daspit, Santa Monica, Calif., assignors to Gilfillan Bros. Inc., Los Angeles, Calif., a corporation of California Application February 3, 1955, Serial No. 485,974

6 Claims. (Cl. 343—8)

This invention relates to a highly discriminative filter and bias-level gating circuit and, more particularly, to a filter and gating circuit where Doppler frequency signals, indicating the presence of a moving object, may be highly accentuated over noise or other clutter.

While the invention may have a multitude of applications, it is particularly useful in velocity tracking systems where moving targets are detected as Doppler frequency signals. The invention allows target detection in such a system with a high degree of discrimination against unwanted component frequencies resulting from rain, noise, or other clutter and consequently aids in increasing the range of target acquisition. A system of this general type is found in copending U. S. patent application Serial No. 492,627 for "Velocity Tracking System for Increasing the Range of Acquisition of Moving Targets" by Lloyd David Ball et al. filed March 7, 1955.

According to the basic principle of the invention, the expected Doppler frequency spectrum is separated into a plurality of band pass intervals, each interval covering a frequency range of $\Delta f/n$, where $\Delta f$ represents the frequency region covering the Doppler frequency spectrum for the range of expected target velocities and $n$ is the number of band pass intervals employed.

Any signals obtained through the separate frequency intervals are individually detected and compared with a threshold bias-level corresponding to the expected statistical noise level in that particular frequency interval. The bias level detection technique employed is alternative or independently operative in the sense that any one of the separately filtered signal and noise components may be compared as an individual component with a noise-proportioned bias level to produce a moving-target-indicating output signal. Thus, in this manner, statistically white noise, considered to be at a constant level throughout the frequency spectrum $\Delta f$ may be effectively divided into $n$ discrete frequency intervals so that the effect of noise in a single interval is $1/n$ times its effect prior to spectrum subdivision.

While the spectrum division parameter $n$ may vary considerably, the theoretical maximum is a function of the expected frequency spectrum for a moving target considering the scanning rate and target size. In other words, the scanned target Doppler spectrum width, the center frequency of which is referred to hereafter as $f_d$, varies as a function of $1/T_w$, where $T_w$ is the utilized time to scan the target. The manner in which the parameter $n$ is thus limited will be better understood by considering a specific example.

It can be shown that with a scanning beam of 0.85° in azimuth at half power points and a scanning rate of 106° per second, the time $T_w$ in scanning an average target is approximately 8 milliseconds. The major part of the Doppler frequency amplitude spectrum developed in scanning this target is available within $1/T_w$ or 125 C. P. S. Thus, where the entire frequency region $\Delta f$ is 2150 C. P. S., the maximum value of $n$ becomes:

$$n = 2150 \text{ C. P. S.}/125 \text{ C. P. S.} = 17$$

since any greater number $n$ would result in a substantial decrease in Doppler signal power. It is assumed here that the "noise bandwidth" of each of the filters preceding the detectors is 125 C. P. S. and that this bandwidth does not appreciably reduce the signal power compared to a very wide or non-discriminating filter.

Another specific contribution of the invention lies in a circuit technique of moderate predetection filtering, detection, and then additional postdetection filtering to further emphasize the low frequency components resulting from detection. This technique, it will be shown, provides a considerable improvement in signal-to-noise ratio without requiring the complexity of the system described above.

The contribution of the invention may be demonstrated as an improvement over the optimum detectability or minimum threshold signal conditions typical of the practice of the prior art. For this purpose the conventional approach to the signal separation problem discussed above will be considered where $\Delta f$ is 2150 C. P. S. and $T_w$ is 8 milliseconds. The band pass region $\Delta f$ then corresponds to the intermediate frequency band "B" specified on page 220 of the M. I. T. Radiation Laboratory Series, volume 24, entitled "Threshold Signals." The parameter $T_w$ corresponds to the reciprocal of the factor "$\tau$" utilized in this book to represent the duration of the signal. Thus factor $B\tau$ for the assumed situation becomes 2150 times 1/125 or 17.

In referring to the signal threshold curves shown on page 220 of this book, it will be noted that the optimum design according to the prior art technique is approximately +9.5 db, where the video bandwidth "$b$" is selected so that the factor $b\tau$ is equal to .4.

If, according to the present invention, the frequency division parameter $n$ is selected so that optimum predetection filtering is achieved, the factor $B\tau$ becomes equal to 1, since effectively the bandwidth $B$ is equal to the reciprocal of the useful signal duration $T_w$. In this case then, referring again to the curves on page 220 of "Threshold Signals," the optimum predetection filter design allows a relative minimum signal threshold level of + 4 db where the factor $b\tau$ is in the range $10 \geq b \geq 1$. This means that it is possible to decrease the minimum signal threshold level by 5.5 db from the level required according to conventional practice and still maintain the same probability of detecting useful signals. This improvement may be slightly offset due to noise accumulation resulting from mixing through the bias-level gate; the loss being in the order of .5 to 1 db. The resultant improvement, however, is still considerable, being in the order of 4.5 to 5 db.

An improvement of lesser degree may be accomplished with a simpler circuit by utilizing the combination technique of predetection and postdetection filtering, according to the other technique of the invention. In this situation assume that the parameter $n$ is reduced to 5 so that the factor $B\tau$ is approximately 3.3. Then reference again to the curves of page 220 in "Threshold Signals" shows that the relative minimum signal threshold is in the order of +6 db for a video bandwidth factor $b\tau = .4$. In this case then the relative improvement provided by the invention is 3.5 db.

In its basic structural form the invention comprises a plurality of filtering means for separating applied Doppler frequency signals variable throughout a region $\Delta f$ into $n$ separate intervals, and a plurality of detectors and bias-level gating circuits coupled to the plurality of filter means, respectively; each of the bias-level gating circuits being responsive to an applied noise-level signal for producing a moving target indicating output signal when any of the filtering means provides a signal having an amplitude greater than the noise-level-indicating signal.

Where the economy of the predetection and postdetection filtering technique is realized, each of the plurality of filtering means in the basic embodiment of the invention includes a predetection filter, a detector circuit, and a postdetection filter which may be a simple RC low pass filter.

Although a multitude of specific types of filters may be utilized in practicing the invention, two basic filter types of predetection filters are illustrated, one based on the well-known m-derived principle and the other being more specifically designed for the purposes of the present invention in order to economize on circuit arrangements.

In a similar manner, although many types of detectors, postdetection filters, and bias level gating circuits are known in the art, two specific arrangements are shown which are suitable for utilization in the present invention in order to aid those skilled in the art in practicing the invention. According to one of the species shown, a positive output signal is produced indicating the detection of a Doppler signal above an expected noise level in a corresponding frequency division, and in the other a negative output signal is produced indicating the same situation.

Another improvement resulting from the employment of the bias-level gating circuits of the present invention is that only the Doppler signal having the largest amplitude is detected. The reason for this is that the common biasing output circuit to which the noise-level signal is applied raises the bias level as soon as the Doppler signal is detected. This means that only the Doppler signal having a level greater than any other Doppler signal present will eventually pass as an output signal. Thus, in this manner, the invention provides a circuit which not only discriminates against noise but also against weaker Doppler signals.

Accordingly, it is an object of the present invention to provide a highly discriminative Doppler frequency filter and bias level gating circuit which may be utilized to detect Doppler frequency signals indicating the presence of a moving object where the Doppler frequency signals are highly accentuated over noise or other clutter.

Another object is to provide a circuit for discriminating moving-object-indicating signal frequencies over noise frequencies with large improvement in signal-to-noise ratio.

A more specific object is to provide a Doppler frequency filter and bias level gating circuit wherein the expected frequency region $\Delta f$ is separated into $n$ divisions increasing the signal-to-noise ratio.

Another specific object is to provide an efficient Doppler frequency filter and bias level gating circuit wherein predetection and postdetection filtering are utilized to achieve a high signal-to-noise ratio without requiring a considerable number of complex circuits.

An additional object is to provide a circuit for detecting frequency components representing a moving object where the circuit may be utilized in a velocity tracking system, the circuit allowing a target detection in such a system with a high degree of discrimination against signal frequencies resulting from rain, noise, or other clutter.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 1 is a block diagram of the basic embodiment of Doppler frequency filter and bias level gating circuit according to the present invention;

Fig. 1a illustrates a typical transmitted radar pulse;

Fig. 1b illustrates a typical Doppler frequency spectrum resulting from the reflection of the pulse of Fig. 1a from a typical moving target;

Fig. 2a illustrates the attenuation characteristics of the various divisions in the circuit of Fig. 2;

Fig. 3a illustrates the attenuation characteristics of the various filter divisions in the circuit of Fig. 3;

Figure 2:
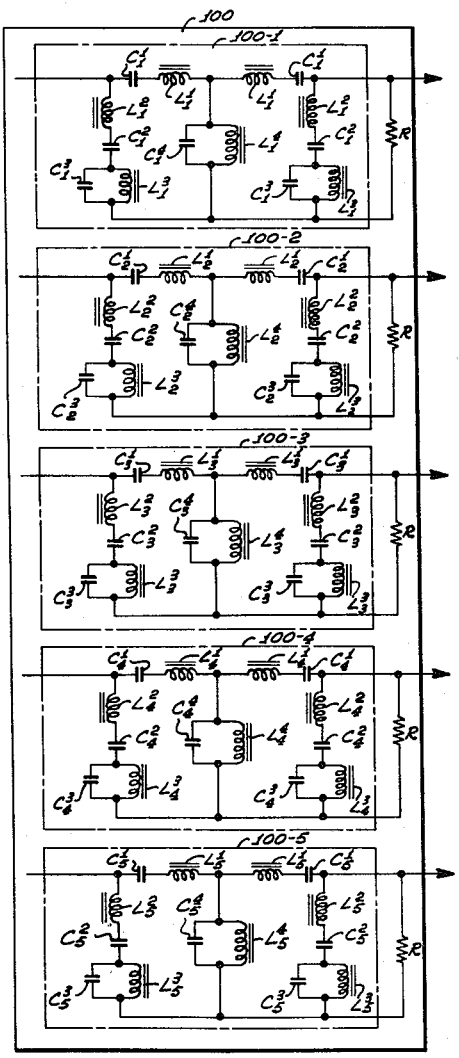
Fig. 2 is a schematic diagram of one form of predetection filter circuit set suitable for utilization in the embodiment of Fig. 1.

Reference is now made to Fig. 1 wherein the basic embodiment of Doppler frequency filter and bias-level gating circuit is shown in block diagram form. As shown in Fig. 1, the basic embodiment comprises a first means 100 for separating applied Doppler frequency signals into a plurality of separate frequency intervals, where $n$ intervals are specified, $n$ being any integer. A particular form of means 100 is shown but will not be presently described since the invention is not so limited. The output signals produced by means 100 are applied to a second means 200 operative as a bias-level gating circuit to detect any Doppler frequency signal produced by means 100 and to compare such a detected signal with a predetermined bias-level set in proportion to average noise amplitude over an expected Doppler frequency region $\Delta f$.

Means 200 provides an output signal indicating the presence of a Doppler frequency signal, in any frequency division of means 100, having a level greater than the bias level proportional to average noise. Essentially, means 200 is alternative in its operation since a signal produced by any one of the frequency divisions in means 100 may be detected and compared with the bias level proportional noise. In this manner the output signal produced by circuit 200 effectively may be considered to represent a comparison in a single frequency interval of the outputs of means 100.

The basic principles of the invention may be better understood by considering the frequency spectrum resulting from scanning a point target as shown in Fig. 1b. In this figure an amplitude spectrum is shown rather than a power spectrum. As shown in Fig. 1b, the amplitude spectrum is symmetrical about the Doppler frequency component $f_d$. This value of this frequency component ($f_d$) may be derived through well-known formulas, such as those shown on page 288 of a book entitled "Radar Engineering" by Fink published in 1947 by The McGraw-Hill Book Company, New York and London. As shown on page 288 of this article, the Doppler frequency or Doppler shift $\Delta f$ (not the $\Delta f$ of the present invention) is defined as follows:

$$\Delta f = f_r - f_0 = \frac{2vf_0}{c}$$

where $\Delta f$ corresponds to $f_d$ of the present specification, $f_r$ is the frequency received after transmission, $f_0$ is the transmitted frequency, $v$ is the velocity of the target, and $c$ is the velocity of light.

In terms of a typical application, $f_d$ in cycles per second (C. P. S.) may be defined by the equation: $f_d = v \times 31.1$, where $v$ is in terms of knots. If a target velocity is 19 knots, for example, then the Doppler frequency which results is 19 times 31.1 or approximately 600 C. P. S.

The amplitude spectrum shown in Fig. 1b is a Fourier spectrum for a single received pulse having the form:

$$f(t) = \left(\frac{\sin kt}{kt}\right)^2$$

as indicated in Fig. 1a.

As indicated in Fig. 1b, the amplitude spectrum has a value of 0 at the frequency points $f_d-T_w$ and $f_d+T_w$. As a result most of the useful Doppler frequency power may be obtained in the region which is $1/2T_w$ C. P. S. to each side of the Doppler frequency $f_d$. The minimum bandwidth of the frequency intervals provided by means 100 therefore should be no less than the frequency width $1/T_w$. Consequently, in the typical example pointed out above where $T_w=8$ milliseconds, the minimum frequency bandwith of the intervals in means 100 becomes 125.0 C. P. S.

Although the invention is not limited to particular filter types, it may prove helpful to those skilled in the art in practicing the invention to illustrate two suitable types of filters which may be employed. Reference is made to Fig. 2, therefore, illustrating a suitable type of filter including five sections providing five frequency divisions as follows:

|  | C. P. S. |
|---|---|
| Section 100—1 | 600–1030 |
| Section 100—2 | 1030–1460 |
| Section 100—3 | 1460–1890 |
| Section 100—4 | 1890–2320 |
| Section 100—5 | 2320–2750 |

This division covers an expected frequency range of 600–2750 C. P. S.

While the values obtained for the embodiment of the invention shown in Fig. 2 are not for predetection filters of the well-known $m$-derived type, these filters may be so designed. The design formulas for the well-known $m$-derived type filters are provided in chapter 6 of a book entitled "Reference Data for Radio Engineers" by Federal Telephone & Radio Corporation published by American Book-Stratford Press, New York, New York, 4th Edition, first printing, 1956. One specific type of $m$-derived filter which may be employed is shown on page 178 and referred to as a six element series band pass filter. The design formulas for this circuit are found on page 179.

The attenuation characteristics of the filter divisions of Fig. 2 are shown in Fig. 2a where it will be noted that the attenuation function is inverted with respect to that shown on page 178 of the book entitled "Reference Data for Radio Engineers." It will also be noted that the actual band pass characteristic does not have infinite attenuation and a sharp cut-off at the specified frequency divisions due to the fact that the inductances are not lossless.

It will be noted that the circuit elements in each division have identifying symbols with a subscript corresponding to the division number. Thus all of the elements in division 100—1 have the subscript 1. It will also be noted that where elements may have the same circuit value the same identifying symbol is utilized. Thus capacitors $C_1{}^1$ in circuit 100—1 have the same value. It will also be noted that the identifying superscript and symbol remain the same throughout the various divisions where the corresponding elements occupy the same position in the respective circuits. Suitable circuit element values for providing the desired frequency division as specified above may then be provided as follows:

*Filter section 100—1*

| Capacitor $C_1{}^1$ | microfarads | .0434 |
|---|---|---|
| Inductor $L_1{}^1$ | millihenrys | 946 |
| Capacitor $C_1{}^2$ | microfarads | .065 |
| Inductor $L_1{}^2$ | millihenrys | 630 |
| Capacitor $C_1{}^3$ | microfarads | .089 |
| Inductor $L_1{}^3$ | millihenrys | 462 |
| Capacitor $C_1{}^4$ | microfarads | .296 |
| Inductor $L_1{}^4$ | millihenrys | 138 |

*Filter section 100—2*

| Capacitor $C_2{}^1$ | microfarads | .0215 |
|---|---|---|
| Inductor $L_2{}^1$ | millihenrys | 785 |
| Capacitor $C_2{}^2$ | microfarads | .0322 |
| Inductor $L_2{}^2$ | millihenrys | 525 |
| Capacitor $C_2{}^3$ | microfarads | .0735 |
| Inductor $L_2{}^3$ | millihenrys | 229 |
| Capacitor $C_2{}^4$ | microfarads | .245 |
| Inductor $L_2{}^4$ | millihenrys | 68.8 |

*Filter section 100—3*

| Capacitor $C_3{}^1$ | microfarads | .011 |
|---|---|---|
| Inductor $L_3{}^1$ | millihenrys | 836 |
| Capacitor $C_3{}^2$ | microfarads | .0164 |
| Inductor $L_3{}^2$ | millihenrys | 558 |
| Capacitor $C_3{}^3$ | microfarads | .0785 |
| Inductor $L_3{}^3$ | millihenrys | 117 |
| Capacitor $C_3{}^4$ | microfarads | .261 |
| Inductor $L_3{}^4$ | millihenrys | 35.2 |

*Filter section 100—4*

| Capacitor $C_4{}^1$ | microfarads | .00871 |
|---|---|---|
| Inductor $L_4{}^1$ | millihenrys | 663 |
| Capacitor $C_4{}^2$ | microfarads | .0131 |
| Inductor $L_4{}^2$ | millihenrys | 442 |
| Capacitor $C_4{}^3$ | microfarads | .062 |
| Inductor $L_4{}^3$ | millihenrys | 93 |
| Capacitor $C_4{}^4$ | microfarads | .207 |
| Inductor $L_4{}^4$ | millihenrys | 27.9 |

*Filter section 100—5*

| Capacitor $C_5{}^1$ | microfarads | .00726 |
|---|---|---|
| Inductor $L_5{}^1$ | millihenrys | 548 |
| Capacitor $C_5{}^2$ | microfarads | .0109 |
| Inductor $L_5{}^2$ | millihenrys | 365 |
| Capacitor $C_5{}^3$ | microfarads | .0513 |
| Inductor $L_5{}^3$ | millihenrys | 77.4 |
| Capacitor $C_5{}^4$ | microfarads | .171 |
| Inductor $L_5{}^4$ | millihenrys | 23.2 |

Figure 3:
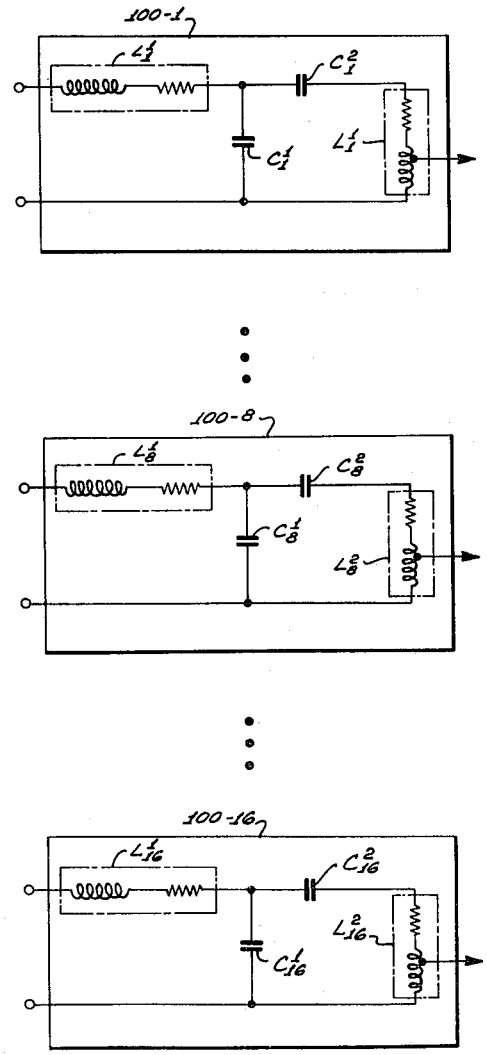
Fig. 3 is a schematic diagram of another form of predetection filter set which may be utilized in the embodiment of Fig. 1.

An alternate form of filter which may be utilized to provide the desired frequency operation is shown in Fig. 3. The filter of Fig. 3 does not have as sharp a cut-off characteristic as that of Fig. 2, as is illustrated in the attenuation characteristics shown in Fig. 3a, but is desirable due to the simplicity of circuits as well as due to the almost complete lack of ringing as compared to filters having very steep skirts.

Referring now to Fig. 3, it is noted that only three filter sections are shown, represented as 100—1, . . . 100—8, . . . and 100—16, indicating that there are a total of 16 similar sections, only three being shown for convenience.

The sixteen sections provide frequency divisions, measured at the −1.5 db points, as follows:

|  | C. P. S. |
|---|---|
| Section 100—1 | 293– 447 |
| Section 100—2 | 447– 601 |
| Section 100—3 | 601– 755 |
| Section 100—4 | 755– 909 |
| Section 100—5 | 909–1063 |
| Section 100—6 | 1063–1217 |
| Section 100—7 | 1217–1371 |
| Section 100—8 | 1371–1525 |
| Section 100—9 | 1525–1679 |

| Section 100—10 | 1679–1833 |
|---|---|
| Section 100—11 | 1833–1987 |
| Section 100—12 | 1987–2141 |
| Section 100—13 | 2141–2295 |
| Section 100—14 | 2295–2449 |
| Section 100—15 | 2449–2603 |
| Section 100—16 | 2603–2757 |

Suitable circuit values for these sections may then be specified as follows:

*Filter section 100–1*

| Capacitor $C_1^1$ | .25 microfarads | $Q_1^1$—3.42 |
| Inductor $L_1^1$ | 634 millihenrys | |
| Capacitor $C_1^2$ | 23000 micromicrofarads | $Q_1^2$—5.00 |
| Inductor $L_1^2$ | 7.35 henrys | |

*Filter section 100–2*

| Capacitor $C_2^1$ | .25 microfarads | $Q_2^1$—4.14 |
| Inductor $L_2^1$ | 345 millihenrys | |
| Capacitor $C_2^2$ | 12800 micromicrofarads | $Q_2^2$—8.82 |
| Inductor $L_2^2$ | 7.86 henrys | |

*Filter section 100–3*

| Capacitor $C_3^1$ | .25 microfarads | $Q_3^1$—5.42 |
| Inductor $L_3^1$ | 209.7 millihenrys | |
| Capacitor $C_3^2$ | 8500 micromicrofarads | $Q_3^2$—10.8 |
| Inductor $L_3^2$ | 6.84 henrys | |

*Filter section 100–4*

| Capacitor $C_4^1$ | .25 microfarads | $Q_4^1$—6.46 |
| Inductor $L_4^1$ | 141.2 millihenrys | |
| Capacitor $C_4^2$ | 5990 micromicrofarads | $Q_4^2$—12.9 |
| Inductor $L_4^2$ | 6.34 henrys | |

*Filter section 100–5*

| Capacitor $C_5^1$ | .25 microfarads | $Q_5^1$—7.65 |
| Inductor $L_5^1$ | 101.6 millihenrys | |
| Capacitor $C_5^2$ | 4280 micromicrofarads | $Q_5^2$—15.30 |
| Inductor $L_5^2$ | 6.27 henrys | |

*Filter section 100–6*

| Capacitor $C_6^1$ | .25 microfarads | $Q_6^1$—8.80 |
| Inductor $L_6^1$ | 76.6 millihenrys | |
| Capacitor $C_6^2$ | 3230 micromicrofarads | $Q_6^2$—17.6 |
| Inductor $L_6^2$ | 6.17 henrys | |

*Filter section 100–7*

| Capacitor $C_7^1$ | .25 microfarads | $Q_7^1$—9.95 |
| Inductor $L_7^1$ | 59.6 millihenrys | |
| Capacitor $C_7^2$ | 2520 micromicrofarads | $Q_7^2$—19.9 |
| Inductor $L_7^2$ | 6.10 henrys | |

*Filter section 100–8*

| Capacitor $C_8^1$ | .25 microfarads | $Q_8^1$—11.1 |
| Inductor $L_8^1$ | 47.7 millihenrys | |
| Capacitor $C_8^2$ | 2020 micromicrofarads | $Q_8^2$—22.2 |
| Inductor $L_8^2$ | 6.05 henrys | |

*Filter section 100–9*

| Capacitor $C_9^1$ | .25 microfarads | $Q_9^1$—12.3 |
| Inductor $L_9^1$ | 39.2 millihenrys | |
| Capacitor $C_9^2$ | 1667 micromicrofarads | $Q_9^2$—24.5 |
| Inductor $L_9^2$ | 5.98 henrys | |

*Filter section 100–10*

| Capacitor $C_{10}^1$ | .25 microfarads | $Q_{10}^1$—13.4 |
| Inductor $L_{10}^1$ | 36.1 millihenrys | |
| Capacitor $C_{10}^2$ | 1397 micromicrofarads | $Q_{10}^2$—26.8 |
| Inductor $L_{10}^2$ | 5.92 henrys | |

*Filter section 100—11*

| Capacitor $C_{11}^1$ | .25 microfarads | $Q_{11}^1$—29.4 |
| Inductor $L_{11}^1$ | 27.9 millihenrys | |
| Capacitor $C_{11}^2$ | 1157 micromicrofarads | $Q_{11}^2$—14.7 |
| Inductor $L_{11}^2$ | 5.94 henrys | |

*Filter section 100—12*

| Capacitor $C_{12}^1$ | .25 microfarads | $Q_{12}^1$—31.8 |
| Inductor $L_{12}^1$ | 23.9 millihenrys | |
| Capacitor $C_{12}^2$ | 992 micromicrofarads | $Q_{12}^2$—15.9 |
| Inductor $L_{12}^2$ | 5.95 henrys | |

*Filter section 100—13*

| Capacitor $C_{13}^1$ | .25 microfarads | $Q_{13}^1$—34.2 |
| Inductor $L_{13}^1$ | 20.7 millihenrys | |
| Capacitor $C_{13}^2$ | 858 micromicrofarads | $Q_{13}^2$—17.1 |
| Inductor $L_{13}^2$ | 5.97 henrys | |

*Filter section 100—14*

| Capacitor $C_{14}^1$ | .25 microfarads | $Q_{14}^1$—36.4 |
| Inductor $L_{14}^1$ | 18.0 millihenrys | |
| Capacitor $C_{14}^2$ | 755 micromicrofarads | $Q_{14}^2$—18.2 |
| Inductor $L_{14}^2$ | 5.92 henrys | |

*Filter section 100—15*

| Capacitor $C_{15}^1$ | .25 microfarads | $Q_{15}^1$—38.8 |
| Inductor $L_{15}^1$ | 15.9 millihenrys | |
| Capacitor $C_{15}^2$ | 667 micromicrofarads | $Q_{15}^2$—19.4 |
| Inductor $L_{15}^2$ | 5.92 henrys | |

*Filter section 100—16*

| Capacitor $C_{16}^1$ | .25 microfarads | $Q_{16}^1$—41.0 |
| Inductor $L_{16}^1$ | 14.1 millihenrys | |
| Capacitor $C_{16}^2$ | 593 micromicrofarads | $Q_{16}^2$—20.5 |
| Inductor $L_{16}^2$ | 5.92 henrys | |

Figure 5:
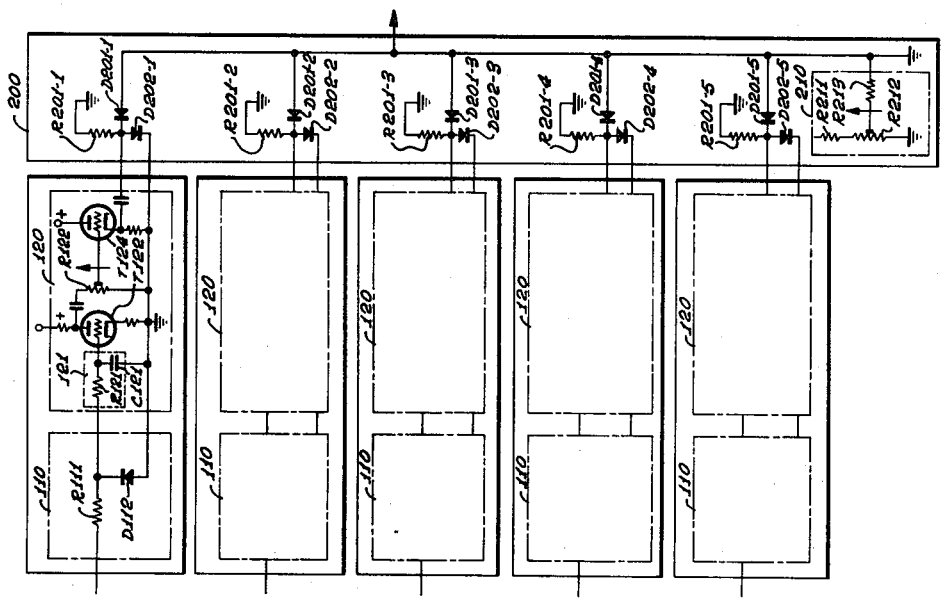
Fig. 5 is a schematic diagram of another suitable set of detectors, postdetection filters, and bias level gating circuits which may be utilized in the embodiment of Fig. 1.
Figure 4:
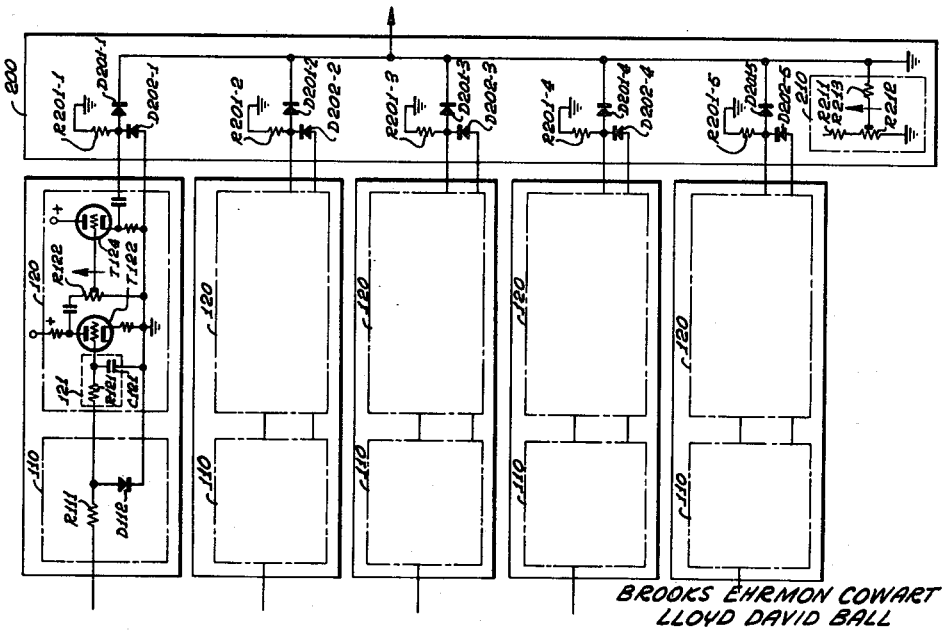
Fig. 4 is a schematic diagram of a suitable set of detectors, postdetection filters, and bias level gating circuits which may be utilized in the embodiment of Fig. 1.

Although the frequency separated signals provided by the filter sections of the type described in Figs. 2 and 3 may be utilized directly in bias-level gates 200, suitable circuits being shown in Figs. 4 and 5; it may be desirable to achieve further frequency discrimination by means of the detection and postdetection filtering technique provided by the invention. It will be understood, however, in describing Figs. 4 and 5 below, that the bias-level gates 200 need not be utilized in connection with detectors 100 and postdetection filters 102, where the additional discrimination is not desired.

Referring now to Fig. 4, it is noted that in one specific form detector 110 may comprise resistors R111 and diodes D112. In Fig. 4 it will be noted that the anodes of diodes D112 are connected to corresponding resistors R111, whereas in the embodiment of Fig. 5 the cathodes of diodes D112 are coupled to corresponding resistors R111. The reason for this variation is that positive signals are detected in the embodiment of Fig. 4, and negative signals are detected in the embodiment of Fig. 5.

Signals thus detected are applied to postdetection filter sections 120, which may include an RC filter section 121 including a resistor R121 and a capacitor C121. The junction of resistor R121 and capacitor C121 is connected to the grid of an amplifier T122 having its output load resistor R122 connected to the grid of a cathode-follower circuit T124. The output signal of cathode-follower circuit T124 contains the low frequency components of the input signal provided by detector 110.

It will be noted that the postdetection filter 120 in the embodiment of Fig. 5 may be identical to those utilized in the embodiment of Fig. 4.

Suitable forms of bias-level gating circuits for passing positive and negative signals are shown in Figs. 4 and 5, respectively. The bias-level gating circuit 200 shown in Fig. 4 includes a series of diodes D201—1, D201—2, . . . D201—n, having anodes connected to the cathode-follower circuits T124—1, T124—2, . . . T125—n, respectively, where the symbol "n" is utilized to indicate that the number of diodes D201 is varied according to the number of filter sections utilized.

Each of the diodes D201 has an input load resistor R201, having one end connected to the anode of the corresponding diode and the other end connected to ground. In addition, there is associated with each diode D201, a second diode D202 having its cathode connected to the junction of resistors R201 and diode D201 and its anode connected to ground. Diodes D202 are operative to prevent negative signals from passing through diodes D201, since such signals find a low load impedance path to ground.

The cathode of each diode D201 is connected to a bias-level signal generating network 210 producing a signal representing the expected statistical noise level through the region $\Delta f$. As shown in Figs. 4 and 5, circuit 210 may include a potentiometer including a resistor R212, the center tap of resistor R212 being connected to an output resistor R213. Suitable positive potential is applied to a resistor R211, resistor R211 being in turn connected to resistor R212.

From the foregoing description it is apparent that the present invention provides a highly discriminative filter and bias level gating circuit where Doppler frequency signals present in a frequency region are separated into a plurality of frequency divisions or intervals and then compared to noise level representing signals in the respective intervals. The technique of the invention makes it possible to increase the accentuation of Doppler frequency signals, which may indicate the presence of a moving object over noise or other clutter.

It should also be noted that any signal passing through one of the diodes D201 also serves to add to the bias level provided by circuit 210. Thus, in particular, a signal is developed across resistors R212 and R213 in addition to the noise-level signal applied to resistor R11. This means, then, that only the largest signal passing through one of the input filters is effective over the combined bias level of the noise-level signal and the other Doppler signals which may be present.

While the invention has been shown in a particular form where signals detected in any frequency interval are compared to a single bias level signal representing statistically averaged noise throughout the region, it will be understood that the basic concept taught herein is applicable as well to a utilization where the noise level represented in each frequency interval is different.

Thus the invention may find application in a system where it is known that clutter, due for example to ground objects, is more pronounced at lower Doppler frequencies and therefore the expected noise bias level for the corresponding frequency intervals is selected to be higher than the bias level for other higher frequency intervals.

The improvement of the invention has been demonstrated by comparing the actual results obtained with those which may be obtained according to conventional techniques by optimizing pre and postdetection filtering in the conventional manner. It has been shown that an improvement in the order of 5 db is possible where the optimum predetection filtering technique of the invention is employed and that an improvement of the order of 3 db is possible where the combination technique of predetection and postdetection filtering is utilized.

While only a few modifications have been shown by way of specific circuits herein, it will be apparent to those skilled in the art that a wide variety of circuits fall within the generic class provided by the invention.

It will be noted that as defined herein the term "noise" is intended to include clutter or other unwanted signals. Consequently, in the appended claims the following terms will be used interchangeably: noise; unwanted signals; unwanted frequency components; and clutter.

What is claimed is:

1. A highly discriminative circuit for detecting Doppler frequency signals present in a frequency region $\Delta f$, the region $\Delta f$ including noise signals statistically averageable throughout the region, said circuit comprising: a plurality of filtering means responsive to received Doppler frequency signals for separating the signals throughout the region $\Delta f$ into a corresponding plurality of separate frequency divisions; a plurality of bias-level gating circuits coupled to said filtering means, respectively, each of said gating circuits including a unidirectional device having an input electrode for receiving the signal produced by the associated filter and an output electrode for passing a signal of a predetermined polarity; means coupling said output electrodes together; means providing a common bias circuit for said second electrode; and means for applying an average noise-level-representing signal to said last-named means, whereby said gating circuits may pass only a Doppler frequency signal having a level greater than the noise level represented, the largest Doppler signal received creating a further bias discriminating against any other Doppler signal of lesser amplitude.

2. A circuit for detecting moving-target-indicating signals, where the frequency of the signals represents the velocity of the target, the variation of velocity expected and corresponding frequency variation being representable as the frequency difference $\Delta f$, the moving-target-indicating signals being mixed with noise signals existing in the frequency difference region $\Delta f$, said circuit comprising: $n$ frequency separating circuits for receiving any signals in the frequency difference region $\Delta f$ and producing corresponding output signals in one of $n$ separate frequency divisions; $n$ gating circuits coupled to said $n$ frequency separating circuits, respectively, each of said gating circuits including a diode having input and output circuits arranged to pass signals of a predetermined polarity; a common impedance coupled to the output circuits of said diodes; and means for applying a bias signal to said comomn impedance having a level selected to prevent unwanted frequency components in the region $\Delta f$ from passing through the corresponding gating circuits along with a moving-target-indicating signal in the particular frequency division, said common impedance also serving to discriminate against all moving-target-indicating signals except that having the largest amplitude.

3. In a system for velocity tracking moving targets, a circuit for detecting the presence of a moving target by the presence of corresponding Doppler signals, the Doppler signals existing in a frequency range corresponding to the range of velocity variation of the expected targets, the system being subject to unwanted signals in particular frequency intervals representable as a bias signal having a corresponding level, said circuit comprising: a plurality of first means for receiving the Doppler signals, each of said first means being operable to pass a different portion of the frequency range, where the bandwidth of the portion is at least as large as the expected bandwidth for the Doppler signals representing a moving target, said first means including a predetection filter for passing Doppler signals in the corresponding portion of the frequency range, a circuit for detecting the signals produced by the associated predetection filter, and a post-detection filter for receiving the detected signals and for passing the low frequency component thereof; and a plurality of second means coupled to said first means, respectively, each of said second means being operable to combine a received Doppler signal passed through the corresponding first means with the corresponding unwanted signal representing bias signal and to produce an output signal representing the part of any signal received having a level greater than said bias signal.

4. A circuit for accentuating Doppler frequency signals in a frequency region over noise statistically averaged throughout the region, the noise being representable as a gating control signal, said circuit comprising: a plurality of filters for receiving the Doppler frequency signals, each of said filters having a bandwidth equal to said region divided by the number in said plurality and covering a different portion of said region, each of said filters including a first circuit for pretetection filtering to produce a first output signal corresponding to a Doppler signal in the associated frequency portion, a second circuit for detecting said first output signal to produce a second output signal referenced to zero frequency, and a third circuit responsive to said second output signal to produce a third output signal containing the low and zero frequency components of said second output signal; and a corresponding plurality of gating circuits coupled to said filters, respectively, and responsive to the gating control signal for passing a received Doppler signal in the corresponding portion of the frequency region which is greater than the statistically average noise throughout said region.

5. The circuit defined in claim 4 wherein each of said second circuits includes a resistor and a diode, said diode having an anode connected to said resistor and having a cathode for receiving a reference potential, said second circuits detecting positive signal portions of said first output signal; and wherein each of said gating circuits includes a first diode and a load resistor, said first diode having an anode connected to said load resistor and a cathode for receiving said gating control signal, each gating circuit further including a second diode having a cathode connected to the junction of said first diode and said resistor and having an anode for receiving said reference potential.

6. The circuit defined in claim 4 wherein each of said second circuits includes a resistor and a diode, said diode having a cathode connected to said resistor and having an anode for receiving a reference potential, said second circuits detecting negative signal portions of said first output signal; and wherein each of said gating circuits includes a load resistor and a first diode having an anode for receiving said gating control signal, each gating circuit further including a second diode having an anode connected to the junction of said first diode and said load resistor and having a cathode for receiving said reference potential.

References Cited in the file of this patent

UNITED STATES PATENTS

| | | |
|---|---|---|
| 1,968,460 | Llewellyn | July 31, 1934 |
| 2,269,011 | Dallos | Jan. 6, 1942 |